(12) United States Patent
Matsunaga et al.

(10) Patent No.: US 11,429,245 B2
(45) Date of Patent: Aug. 30, 2022

(54) INFORMATION PROCESSING APPARATUS

(71) Applicant: NTT DOCOMO, INC., Chiyoda-ku (JP)

(72) Inventors: Yuki Matsunaga, Chiyoda-ku (JP); Aya Murakami, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 17/420,285

(22) PCT Filed: Feb. 19, 2020

(86) PCT No.: PCT/JP2020/006441
§ 371 (c)(1),
(2) Date: Jul. 1, 2021

(87) PCT Pub. No.: WO2020/171107
PCT Pub. Date: Aug. 27, 2020

(65) Prior Publication Data
US 2022/0091721 A1 Mar. 24, 2022

(30) Foreign Application Priority Data
Feb. 19, 2019 (JP) .............................. JP2019-027276

(51) Int. Cl.
*G06F 3/08* (2006.01)
*G06F 3/04812* (2022.01)
*G06F 3/01* (2006.01)

(52) U.S. Cl.
CPC .......... *G06F 3/04812* (2013.01); *G06F 3/017* (2013.01)

(58) Field of Classification Search
CPC .... G06F 3/04812; G06F 3/017; G06F 3/0482; G06F 3/01; G06F 3/038; G06F 3/0481
See application file for complete search history.

(56) References Cited

U.S. PATENT DOCUMENTS 9,652,125 B2 * 5/2017 Penha ................ H04N 21/4312
2013/0176219 A1 * 7/2013 Bae .................. H04N 21/44213
345/157

FOREIGN PATENT DOCUMENTS

JP        H06289834 A  * 10/1994 ............. G06F 3/048
JP        2001-125703 A    5/2001

OTHER PUBLICATIONS

International Search Report dated Apr. 7, 2020 in PCT/JP2020/006441 filed Feb. 19, 2020.

* cited by examiner

*Primary Examiner* — Mohamed Abou El Seoud
(74) *Attorney, Agent, or Firm* — Oblon, McClelland, Maier & Neustadt, L.L.P.

(57) ABSTRACT

An information processing apparatus 10 is an information processing apparatus that displays item images GI-1 to GI-6 arranged apart from each other and a cursor CUR on a display 20. The information processing apparatus includes: a receiver 111 configured to receive operation information corresponding to details of a cursor operation of allowing a user to move the cursor CUR; a controller 112 configured to cause the display 20 to display the cursor CUR, based on the operation information; and a determiner 113 configured to, when the operation information includes an instruction to move the cursor CUR from an inside of one item image from among the item images GI-1 to GI-6 to an outside of the one item image, determine whether there is another item image within a predetermined distance from the one item image, the another item image being in a direction of movement of the cursor CUR. When the result made by the determiner 113 is affirmative, the controller 112 is configured to move the cursor CUR to the inside of the other item image by skipping a region between the one item image and the other item image.

8 Claims, 8 Drawing Sheets

INFORMATION PROCESSING APPARATUS

TECHNICAL FIELD

The present invention relates to information processing apparatuses.

BACKGROUND ART

In an information processing apparatus using a graphical user interface (GUI), for example, as disclosed in Patent Literature 1, an item image such as an icon is selected using a cursor. Patent Literature 1 discloses that a technique of switching movement of a cursor between a continuity mode in which the cursor moves continuously in units of one dot and a skip mode in which the cursor skips in units of ten dots. Patent Document 1 also discloses that an amount of skip of the cursor (a distance which is skipped by the cursor) in the skip mode is set to an interval between icons in advance and the icons are sequentially selected without detaching the cursor from the icons. Here, switching between the continuity mode and the skip mode is manually performed by a user's operation.

RELATED ART DOCUMENT

Patent Document

Patent Document 1: Japanese Patent Application Laid-Open Publication No. 2001-125703

SUMMARY OF THE INVENTION

Problem to be Solved By the Invention

In the technique described in Patent Literature 1, when the cursor is caused to skip from a selected icon to another icon, the cursor needs to be switched from the continuity mode to the skip mode in advance, and thus operability is poor.

Means of Solving the Problems

In order to solve the abovementioned problem, an information processing apparatus according to an exemplary aspect of the invention is an information processing apparatus that displays item images arranged apart from each other and a cursor on a display, the information processing apparatus comprising: a receiver configured to receive operation information corresponding to details of a cursor operation of allowing a user to move the cursor; a controller configured to cause the display to display the cursor, based on the operation information; and a determiner configured to, when the operation information includes an instruction to move the cursor from an inside of one item image from among the item images to an outside of the one item image, determine whether there is another item image within a predetermined distance from the one item image, the another item image being in a direction of movement of the cursor, in which the controller is configured to move the cursor to the inside of the another item image by skipping a region between the one item image and the another item image when a result of determination made by the determiner is affirmative.

Effect of the Invention

With the information processing apparatus according to the invention, since the controller moves the cursor to the inside of one item image by skipping a region between the one item image and another item image on the basis of a result of determination made by the determiner, manual switching is not required in advance as in the related art, and operability is enhanced.

MODES FOR CARRYING OUT THE INVENTION

Figure 1:
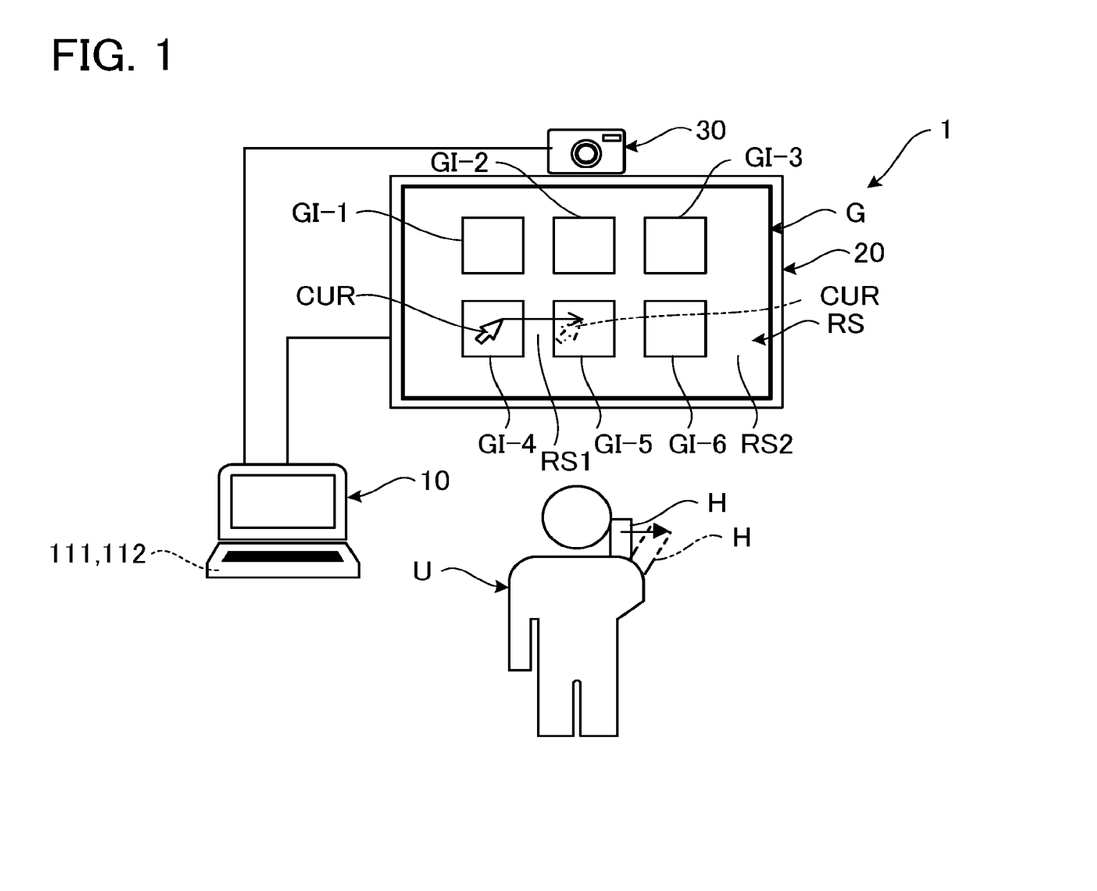
FIG. 1 is an exemplary schematic diagram illustrating the appearance of a configuration of a system using an information processing apparatus according to a first embodiment.

1. First Embodiment 1.1. Outline of System Using Information Processing Apparatus FIG. 1 is an exemplary schematic diagram illustrating the appearance of a configuration of a system 1 using an information processing apparatus 10 according to a first embodiment. The system 1 illustrated in FIG. 1 performs various information processes using a graphical user interface. In this embodiment, an information processing apparatus having a configuration in which an input operation is performed according to movement (a gesture) of a hand H of a user U will be described.

As illustrated in FIG. 1, the system 1 includes an information processing apparatus 10, a display 20, and an imaging device 30. The information processing apparatus 10 is a computer device having a configuration that will be described in detail later. FIG. 1 exemplifies a case in which the information processing apparatus 10 is a laptop computer. The information processing apparatus 10 is not limited to a laptop computer and may be, for example, a desktop computer, a smartphone, or a tablet. The information processing apparatus 10 may be constituted by ready-made hardware or may be constituted by dedicated hardware.

Various types of display panels, such as a liquid crystal display panel and an organic electroluminescent (EL) display panel, may be used for the display 20. The display 20 may be a projector that displays an image by projecting image beams onto a screen or may be a head-mounted display or a head-up display.

The imaging device 30 captures an image of a user U and outputs data indicative of the captured image. The captured image is constituted, for example, by pixels which are arranged in a matrix. The data includes information on luminance or the like for each pixel of the captured image. The imaging device 30 includes, for example, an imaging optical system and an imaging element. The imaging optical system is an optical system including at least one imaging lens and may include various types of optical elements, such as a prism, or may include a zoom lens or a focusing lens. The imaging element composed of, for example, a charge-coupled device (CCD) image sensor or a complementary MOS (CMOS) image sensor or the like. In the example illustrated in FIG. 1, the imaging device 30 is installed above the display 20. The installation position of the imaging device 30 is not limited to the example illustrated in FIG. 1 and may be freely selected as long as it can capture an image of a user U.

In the system 1, the information processing apparatus 10 causes the display 20 to display an image G including item images GI-1 to GI-6 and a cursor CUR. The information processing apparatus 10 receives an input operation made by the user U, based on the data from the imaging device 30 and moves the cursor CUR. For example, when a hand H moves from a position indicated by a solid line in FIG. 1 to a position indicated by a line with alternating long and two short dashes, the cursor CUR moves from the position (an item image GI-4) indicated by the solid line in FIG. 1 to the position (an item image GI-5) indicated by the line with alternating long and two short dashes. In the following description, when the item images GI-1 to GI-6 do not need to be distinguished from each other, each of the item images GI-1 to GI-6 is also referred to as an item image GI.

When the cursor CUR moves from one item image GI from among the item images GI-1 to GI-6 to another item image GI, the cursor CUR does not pass through, but instead skips a region RS1 between the one item image GI and the other item image GI. Accordingly, a situation in which neither the one item image GI nor the other item image GI is selected by the cursor CUR is prevented. Here, the item images GI-1 to GI-6 are arranged apart from each other. Accordingly, in comparison with a case in which the item images GI-1 to GI-6 are arranged in contact with each other, the user U can confirm visually with ease which of the one item image GI and the other item image GI is selected by the cursor CUR.

When the cursor CUR moves from one item image GI from among the item images GI-1 to GI-6 to a region RS other than the item images GI-1 to GI-6, the position of the cursor CUR changes continuously from the inside of the one item image GI to the region RS. In the region RS, the position of the cursor CUR can be continuously changed to a desired position. Accordingly, in comparison with a case in which movement of the cursor CUR in the region RS is prohibited or the cursor CUR is caused to skip the region RS, it is possible to enhance operability at the time of selection of a desired item image GI. The region RS includes the abovementioned region RS1 and a square-enclosed region RS2 surrounding a group including the item images GI-1 to GI-6 as a whole.

1.2. Hardware Configuration of System Using Information Processing Apparatus

Figure 2:
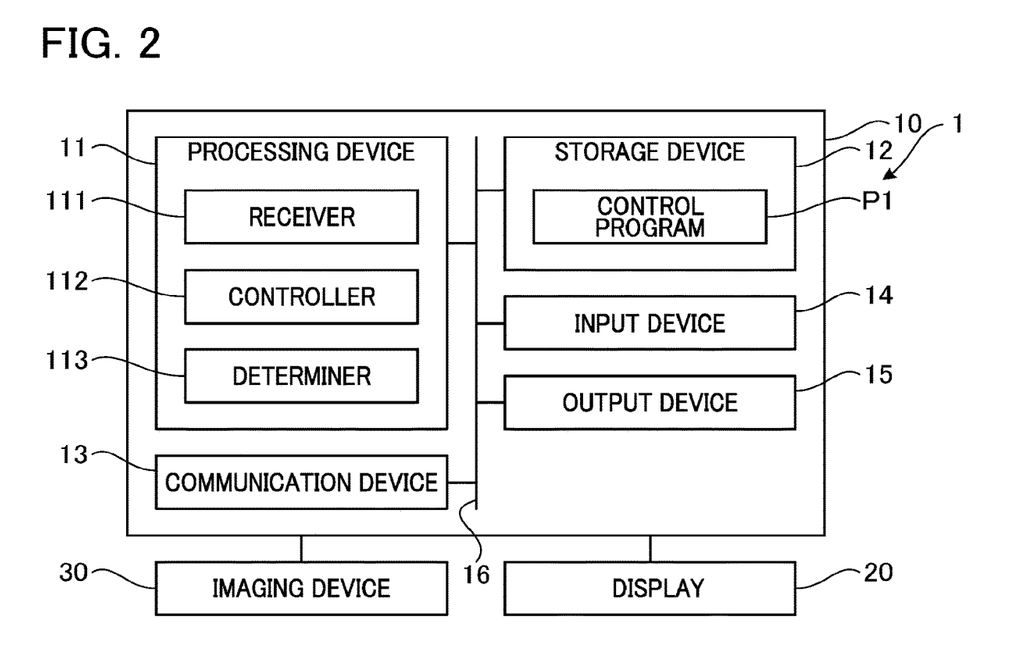
FIG. 2 is a block diagram illustrating the system using the information processing apparatus according to the first embodiment.

FIG. 2 is a block diagram illustrating the system 1 using the information processing apparatus 10 according to the first embodiment. As illustrated in FIG. 2, the information processing apparatus 10 includes a processing device 11, a storage device 12, a communication device 13, an input device 14, an output device 15, and a bus 16 that connects these devices. The bus 16 may be constituted by a single bus or may be constituted by different buses for the devices.

The processing device 11 is a processor that controls the information processing apparatus 10 as a whole and is constituted, for example, by one or two or more chips. The processing device 11 is constituted, for example, by a central processing unit (CPU) including an interface with peripherals, an arithmetic operation device, and a register. Some or all of the functions of the processing device 11 may be realized in hardware such as a digital signal processor (DSP), an application-specific integrated circuit (ASIC), a programmable logic device (PLD), or a field programmable gate array (FPGA). The processing device 11 performs various types of processes in parallel or sequentially.

The storage device 12 is a recording medium which can be read by the processing device 11 and stores programs including a control program P1 which are executed by the processing device 11 and various types of data which are used by the processing device 11. The storage device 12 is constituted, for example, by one or more types of storage circuits such as a read only memory (ROM), an erasable programmable ROM (EPROM), an electrically erasable programmable ROM (EEPROM), and a random access memory (RAM).

The communication device 13 communicates with another device. The communication device 13 has a function of communicating with another device via a network such as a mobile communication network or the Internet and a function of communicating with another device by short-range radio communication. Examples of the short-range radio communication include Bluetooth (registered trademark), ZigBee, and WiFi (registered trademark). In this embodiment, the communication device 13 communicates with the display 20 and the imaging device 30.

The input device 14 receives an input from the outside (for example, a keyboard, a mouse, a microphone, a switch, a button, or a sensor). The input device 14 may include the imaging device 30. The input device 14 may be provided or omitted as necessary.

The output device 15 performs output to the outside (for example, a display, a speaker, or an LED lamp). The output device 15 may be a structure (for example, a touch panel) which is unitary with the input device 14. The output device 15 may include the display 20. The output device 15 may be provided or omitted as necessary.

1.3. Function of Information Processing Apparatus

The processing device 11 serves as a receiver 111 and a controller 112 by executing the control program P1 read from the storage device 12. Accordingly, the information processing apparatus 10 includes a receiver 111, a controller 112, and a determiner 113.

The receiver 111 receives operation information corresponding to details of a cursor operation of allowing a user U to move the cursor CUR. The receiver 111 according to this embodiment detects a gesture of the user U on the basis of data from the imaging device 30 and receives operation information corresponding to details of the cursor operation using the gesture. Specifically, the receiver 111 identifies the position of the hand H of the user U from a captured image indicated by data from the imaging device 30, considers movement of the position as the cursor operation of the user U, and outputs a signal including the operation information corresponding to details of the cursor operation. For example, the receiver 111 detects the hand H in a specific state, and receives the operation information in a period in which the hand H is in the specific state. The specific state is not particularly limited and an example thereof is a state in which the user U holds the palm of the hand H up to the display 20 or the imaging device 30. The position of the hand H is identified, for example, as coordinate values in a two-dimensional coordinate system which is set in the captured image. The operation information is, for example, information indicative of change in the coordinate values in the two-dimensional coordinate system which is set in the captured image. For example, an image processing technique, such as template matching, may be used to detect a gesture in the receiver 111. Determination criteria for detection of a gesture in the receiver 111 may change, for example, depending on results of machine learning or the like.

The controller 112 displays item images GI and the cursor CUR on the display 20. Here, the controller 112 causes the display 20 to display the cursor CUR on the basis of the operation information from the receiver 111. Specifically, the controller 112 changes the position of the cursor CUR in a display area of the display 20 in accordance with the following two criteria: an amount of a cursor operation based on the operation information from the receiver 111; and a direction of movement of the cursor based on the operation information. For example, when the operation information is information indicative of change in the coordinate values in the two-dimensional coordinate system, the amount of the cursor operation refers to an amount of change (an amount of movement) in the coordinate values. That is, the amount of the cursor operation indicates a distance by which the hand H of the user U has been moved. For example, in a case in which the operation information indicates change in the coordinate values in the two-dimensional coordinate system, the direction of the cursor operation refers to a direction of movement of the coordinate values. Display control of the controller 112 will be described below in detail.

Figure 3:
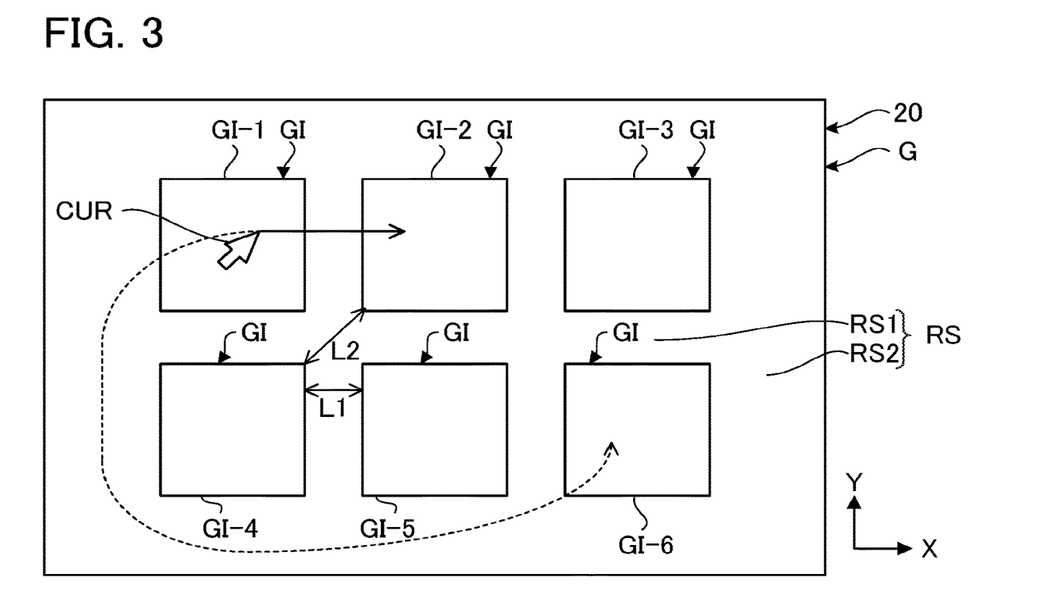
FIG. 3 is an exemplary diagram illustrating a screen on a display.

FIG. 3 is an exemplary diagram illustrating a screen on the display 20. In the following description, as illustrated in FIG. 3, the horizontal direction of the display area of the display 20 is defined as an X direction and the vertical direction thereof is defined as a Y direction. As illustrated in FIG. 3, the controller 112 displays an image G including item images GI-1 to GI-6 and a cursor CUR on the display 20. The cursor CUR moves in the image G. Each of the item images GI-1 to GI-6 is, for example, an icon or a button issuing a predetermined instruction when it is selected by the cursor CUR. Here, the item images GI-1 to GI-6 are apart from each other and are arranged in a matrix shape in the X direction and the Y direction. In the example illustrated in FIG. 3, sixth item images GI-1 to GI-6 have the same shape and size and are arranged at equal intervals in the X direction and the Y direction. The shape, the size, the number, the arrangement, and the like of the item images GI are not limited to the example illustrated in FIG. 3 and may be freely selected. The "cursor" may be replaced with a pointer or the like.

As described above, the image G includes a region RS other than the item images GI-1 to GI-6 in addition to the item images GI-1 to GI-6 and the cursor CUR. The region RS includes a region RS1 between the item images GI-1 to GI-6 and a square-enclosed region RS2 surrounding a group including the item images GI-1 to GI-6 as a whole. When the cursor CUR is located in the region RS, the controller 112 continuously changes the position of the cursor CUR according to movement of the hand H. When the cursor CUR is located inside of one item image GI from among the item images GI-1 to GI-6, the controller 112 changes the behavior of the cursor CUR according to the direction of movement of the cursor CUR on the basis of a result of a determination made by the determiner 113. Here, when the operation information from the receiver 111 indicates that the cursor CUR moves from the inside of one item image GI from among the item images GI-1 to GI-6 to the outside, the determiner 113 determines whether there is another item image GI within a predetermined distance D from the one item image GI, the other item image GI being in the direction of movement of the cursor CUR.

Figure 4:
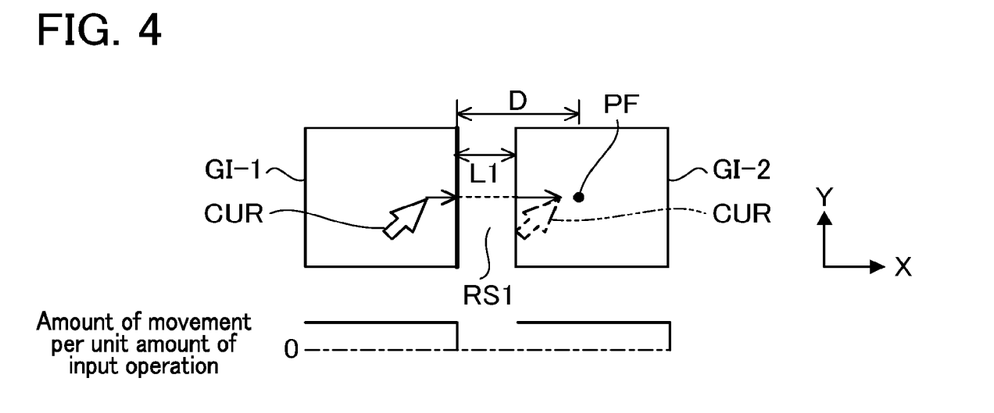
FIG. 4 is a diagram illustrating an example in which a cursor moves from one selected item image to another item image.

FIG. 4 is a diagram illustrating an example in which the cursor CUR moves from one selected item image GI-1 to another item image GI-2. In the example illustrated in FIG. 4, since there is the item image GI-2 as the other item image GI within the predetermined distance D from the item image GI-1 in the direction (the positive X direction) of movement of the cursor CUR, the result of determination made by the determiner 113 is affirmative. Here, for example, the determiner 113 determines whether an outer edge of another item image GI crosses a segment, the segment connecting to a position PF separated by predetermined distance D from the item image GI-1 and the position PF being in the direction of movement of the cursor CUR. When the result of determination made by the determiner 113 is affirmative, the controller 112 moves the cursor CUR to the inside of the item image GI-2 by jumping over the region RS1. That is, when another item image GI-2 is located within the predetermined distance D from the selected item image GI-1, the other item image GI-2 being in the direction of movement of the cursor CUR, the controller 112 moves the cursor CUR to the other item image GI-2 by jumping over the region RS. In the example illustrated in FIG. 4, the number of other item images GI located within the predetermined distance D is one, but the number of other item images GI located within the predetermined distance D may be two or more. In this case, the controller 112 designates an item image GI closest to the selected item image GI from among the two or more item images GI located within the predetermined distance D as a destination of the cursor CUR.

The predetermined distance D is a freely selected distance which is equal to or greater than a distance L1 between the item image GI-1 and the item image GI-2 and is equal to or less than a maximum value which can be obtained in the display area of the display 20. As long as the predetermined distance D is equal to or greater than the distance L1, the position PF is not limited to the position illustrated in FIG. 4. The controller 112 sets the predetermined distance D to, for example, a distance equal to or greater than a distance L2 between two item images GI adjacent to each other with the largest distance from among the item images GI-1 to GI-6. By this setting, the cursor CUR can jump over the region RS1 between two item images GI which are obliquely adjacent to each other. The predetermined distance D may be fixed or variable. In a case in which the predetermined distance D is variable, the predetermined distance D may change, for example, depending on the direction of movement of the cursor CUR. When the number of candidates for the distance between two item images GI adjacent to each other is two or more, the controller 112 may appropriately set the predetermined distance D on the basis of a maximum distance and a minimum distance from among the candidates. By this setting, even when another movement of the cursor CUR occurs, conditions so that the position of the cursor CUR changes continuously in the region RS1 can also be set. For example, by setting the predetermined distance D to a distance which is equal to or greater than L1 and less than L2, a user U can move the cursor CUR in the region RS1 without the cursor CUR jumping even when the direction of movement of the cursor CUR is directed from the item image GI-1 to the item image GI-5.

Here, the determiner 113 in this embodiment determines whether there is another item image GI within the predetermined distance D and whether an amount of input operation indicating the magnitude of the cursor operation in the receiver 111 is greater than or equal to a predetermined amount. Accordingly, the controller 112 moves the cursor CUR in the inside of the item image GI-1 according to the amount of input operation in the operation information from the receiver 111 until the result of determination made by the determiner 113 is affirmative. At this time, when the cursor CUR has reached an outer edge of the item image GI-1 (a side indicated by a bold line in FIG. 4), the controller 112 does not move, but stops the cursor CUR in the state in which the cursor CUR is in contact with the outer edge of the item image GI-1 until the result of determination made by the determiner 113 is affirmative. This provides the user U with a feeling of operation that the cursor CUR has difficulty departing from the selected item image GI-1.

It is preferable that the controller 112 set the predetermined amount which is used for determination in the determiner 113 on the basis of the distance L1. In other words, it is preferable that the controller 112 change a necessary amount of input operation which is received by the receiver 111 to move the cursor CUR from the item image GI-1 to the item image GI-2 on the basis of the distance L1. Specifically, as the distance L1 increases, the predetermined amount is preferably set to be greater. In this case, it is possible to decrease a variation in a feeling of operation due to the variation in the distance L1.

The necessary amount of input operation which is received by the receiver 111 for a user U to move the cursor CUR from the item image GI-1 to the item image GI-2 (hereinafter also referred to as an "amount of input operation in selection") may be the same as, or different from, a necessary amount of input operation which is received by the receiver 111 for the user U to move the cursor CUR by the distance L1 in a region RS other than the item images GI-1 to GI-6 (hereinafter also referred to as an "amount of input operation in non-selection"). When the amount of input operation in selection is greater than the amount of input operation in non-selection, this provides the user U with a feel of operation that the cursor CUR is bound to the item image GI-2. On the other hand, when the amount of input operation in selection is less than the amount of input operation in non-selection, this provides the user U with a feeling of operation that the cursor CUR has difficulty departing from the selected item image GI-1.

Even when a user U moves the cursor CUR from the item image GI-2 to the item image GI-1, control of the controller 112 is the same as illustrated in FIG. 4, except that the direction of movement of the cursor CUR is different. Even when a user U moves the cursor CUR between two item images GI adjacent to each other in the X direction, the control of the controller 112 is the same as illustrated in FIG. 4. Even when a user U moves the cursor CUR between two item images GI adjacent to each other in the Y direction, the control of the controller 112 is the same as illustrated in FIG. 4, except that the direction of movement of the cursor CUR is different. Even when a user U moves the cursor CUR between two item images GI adjacent to each other obliquely with respect to the X direction and the Y direction, such as when the user U moves the cursor CUR from the item image GI-1 to the item image GI-5, the control of the controller 112 is the same as illustrated in FIG. 4, except that the direction of movement of the cursor CUR is different.

Figure 5:
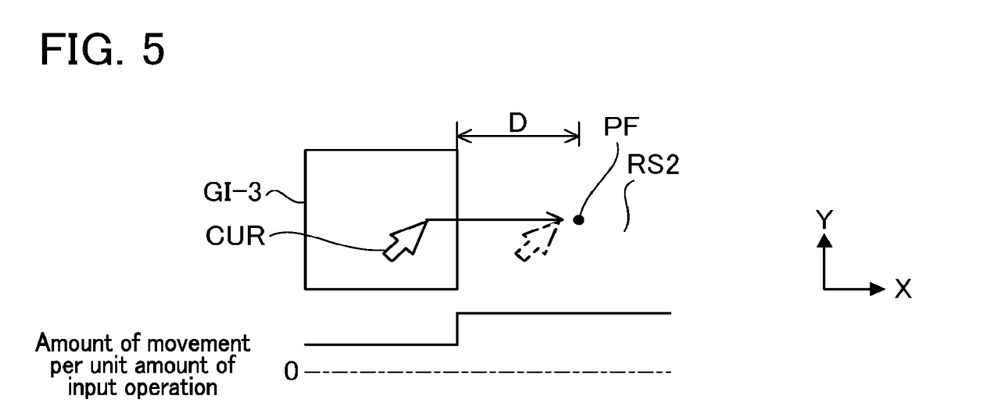
FIG. 5 is a diagram illustrating an example in which a cursor moves from one selected item image to a region other than the item image.

FIG. 5 is a diagram illustrating an example in which the cursor CUR moves from one selected item image GI-3 to a region RS other than the item images GI-1 to GI-6. In the example illustrated in FIG. 5, since there is no other item image GI at the predetermined distance from the item image GI-3 in the direction (the positive X direction) of movement of the cursor CUR, the result of determination made by the determiner 113 is negative. When the result of determination made by the determiner 113 is negative, the controller 112 continuously changes the position of the cursor CUR from the inside of the item image GI-3 to the outside (that is, the region RS) as illustrated in FIG. 5. In the region RS, the position of the cursor CUR can be continuously changed to a freely selected position.

When the cursor CUR is located in the inside of one item image GI from among the item images GI-1 to GI-6, the controller 112 in this embodiment decreases an amount of movement of the cursor CUR per unit amount of cursor operation (hereinafter also referred to as an "amount of movement per unit amount of input operation of the cursor CUR") indicated by the operation information received by the receiver 111 in comparison with a case in which the cursor CUR is located in the region RS other than the item images GI-1 to GI-6. More specifically, the controller 112 includes a low-speed mode and a high-speed mode, and selectively switches a mode which is used between these modes on the basis of the operation information from the receiver 111. The low-speed mode refers to a mode in which the amount of movement per unit amount of input operation of the cursor CUR is a first amount of movement. The high-speed mode refers to a mode in which the amount of movement per unit amount of input operation of the cursor CUR is a second amount of movement greater than the first amount of movement. Setting the amount of movement per unit amount of input operation of the cursor CUR to be different between the inside and the outside of the item images GI in this way provides the user U with a feeling of operation that the cursor CUR has difficulty departing from the selected item image GI. Alternatively, the user U can rapidly move the cursor CUR in the region RS. The amount of movement per unit amount of input operation of the cursor CUR may be set to be constant.

When the cursor CUR is located in the region RS, the controller 112 changes the amount of movement of the cursor CUR per unit amount of the cursor operation, the cursor operation being indicated by the operation information received by the receiver 111, on the basis of a position between the cursor CUR and an item image GI from among the item images GI-1 to GI-6, the item image GI being located in the direction of movement of the cursor CUR. In this case, in comparison with a case in which the amount of movement per unit amount of input operation of the cursor CUR is constant, it is possible to enhance the operability of the cursor CUR. For example, as the item image GI located in the direction of movement of the cursor CUR is farther from the cursor CUR, the amount of movement per unit amount of input operation of the cursor CUR for the receiver 111 is set to be greater. Accordingly, the user U can make a rapid and accurate move of the cursor CUR to a desired item image GI with ease.

Even when a user U moves the cursor CUR from the item image GI-6 to the region RS, the control of the controller 112 is the same as that illustrated in FIG. 5. Even when a user U moves the cursor CUR from another item image GI to the region RS, the control of the controller 112 is the same as that illustrated in FIG. 5, except that the direction of movement of the cursor CUR is different. For example, when a user U moves the cursor CUR from the item image GI-1 to the region RS, the user U can rapidly move the cursor CUR to the item image GI-6 farthest from the item image GI-1 via the region RS2, as indicated by a dotted line in FIG. 3.

1.4. Operations of Information Processing Apparatus

Figure 6:
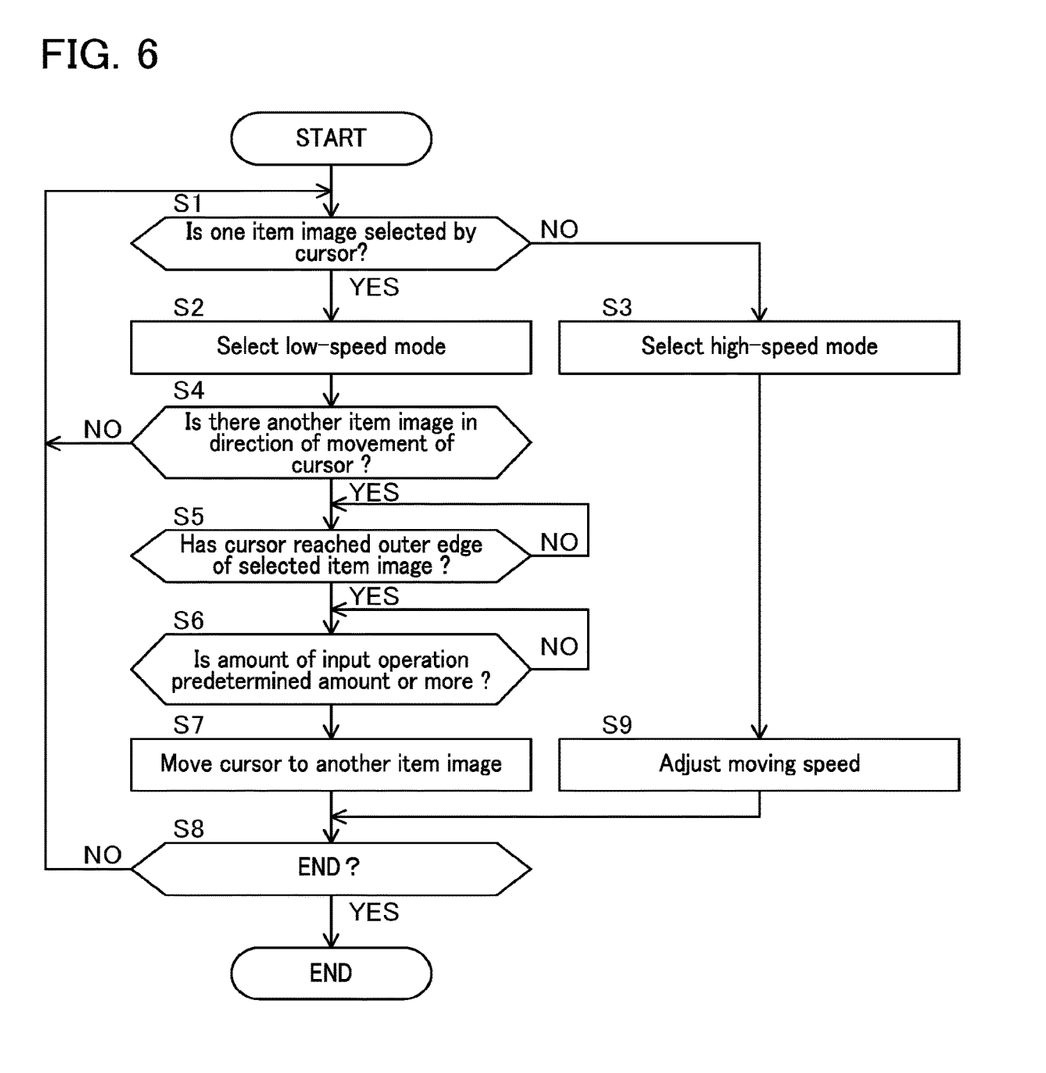
FIG. 6 is a flowchart illustrating an operation of the information processing apparatus according to the first embodiment.

FIG. 6 is a flowchart illustrating an operation of the information processing apparatus 10 according to the first embodiment. A flow of movement control of the cursor CUR will be described below with reference to FIG. 6. As illustrated in FIG. 6, first, the determiner 113 determines whether the cursor CUR selects one item image GI from among the item images GI-1 to GI-6 (S1). When the result of determination at Step S1 is affirmative, the controller 112 selects the low-speed mode (S2). On the other hand, when the result of determination at Step S1 is negative, the controller 112 selects the high-speed mode (S3).

After Step S2, the determiner 113 determines whether there is another item image GI within the predetermined distance D from the selected item image GI, the other item image GI being in the direction of movement of the cursor CUR (S4). When there is no other item image GI within the predetermined distance D, the operation flow returns to Step S1.

When there is another item image GI within the predetermined distance D, the controller 112 determines whether the cursor CUR has reached the outer edge of the selected item image GI (S5). Step S5 is repeatedly performed until the cursor CUR reaches the outer edge of the selected item image GI.

When the cursor CUR has reached the outer edge of the selected item image GI, the determiner 113 determines whether the amount of input operation indicating the magnitude of the cursor operation in the receiver 111 is equal to or greater than a predetermined amount (S6). Step S6 is repeatedly performed until the amount of input operation is equal to or greater than the predetermined amount.

When the amount of input operation is equal to or greater than the predetermined amount, the result of determination made by the determiner 113 is affirmative and the controller 112 moves the cursor CUR to another item image GI adjacent to the selected item image GI in the direction of movement of the cursor CUR (S7). Thereafter, the controller 112 determines whether an ending instruction has been issued (S8). When an ending instruction has not been issued, the operation flow returns to Step S1. On the other hand, when an ending instruction has been issued, the operation flow ends.

After Step S3, the controller 112 adjusts the amount of movement per unit amount of input operation of the cursor CUR on the basis of a position between the cursor CUR and the item image GI located in the direction of movement of the cursor CUR (S9). Thereafter, the operation flow transitions to Step S8.

In the information processing apparatus 10, when the cursor CUR is moved from the inside of one item image GI from among the item images GI-1 to GI-6 to the outside thereof, the controller 112 moves the cursor CUR as follows. Specifically, when there is another item image GI within the predetermined distance D from the one item image GI, the other item image GI being in the direction of movement of the cursor CUR, the controller 112 moves the cursor CUR to the inside of the other item image GI without dropping in at the region RS between the one item image GI and the other item image GI. Accordingly, it is possible to prevent a situation in which neither the one item image GI nor the other item image GI is selected by the cursor CUR. Since the item images GI are arranged apart from each other, a user U can visually acknowledge with ease which of the one item image GI and the other item image GI is selected by the cursor CUR, in contrast with a case in which the item images GI are arranged in contact with each other.

On the other hand, when there is no other item image GI within the predetermined distance D, the controller 112 continuously changes the position of the cursor CUR from the inside of the one item image GI to the outside thereof. Accordingly, the user U can rapidly move the cursor CUR from the one item image GI to a freely selected item image GI other than the other item image GI from among the item images GI-1 to GI-6 without dropping in at the other item image GI. As a result, in comparison with a case in which the cursor CUR drops in at the other item image GI, it is possible to enhance the operability at the time of selection of the freely selected item image GI.

2. Second Embodiment

A second embodiment of the invention will be described below. In the embodiment which will be described below, elements having the same operations or functions in this embodiment as in the first embodiment will be referred to by the same reference signs used in the first embodiment, and detailed description thereof will be appropriately omitted.

Figure 7:
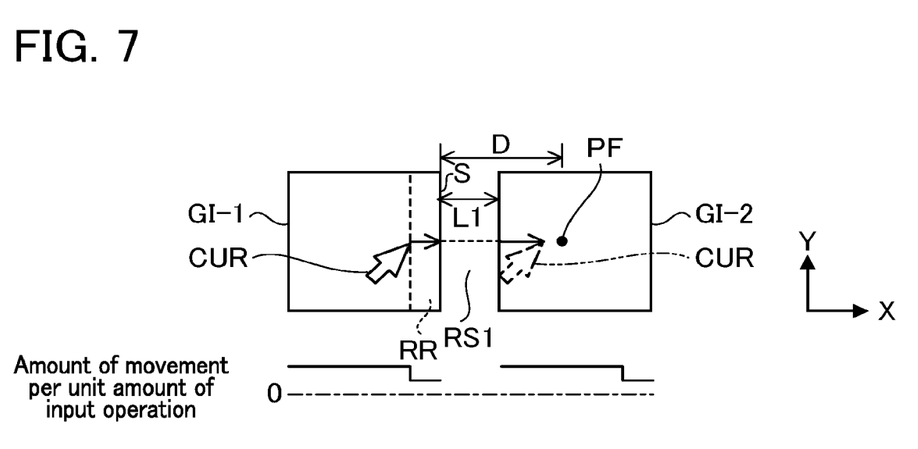
FIG. 7 is a diagram illustrating an example in which a cursor moves from one selected item image to another item image in a second embodiment.

FIG. 7 is a diagram illustrating an example in which a cursor CUR moves from one selected item image GI-1 to another item image GI-2 in the second embodiment. In the inside of the item image GI-1 in this embodiment, as illustrated in FIG. 7, a reduction region RR with a predetermined width along the right side S of the item image GI-1 figure is provided. The reduction region RR refers to a region in which the amount of movement per unit amount of input operation of the cursor CUR decreases for the receiver 111. The degree of decrease is determined depending on the width or the area of the reduction region RR and is not particularly limited, but is within a range of, for example, 20% to 80% of that in the normal state.

The controller 112 in this embodiment moves the cursor CUR at the same moving speed as in the first embodiment on the basis of the amount of input operation of the receiver 111 until the cursor CUR reaches the reduction region RR. When the cursor CUR reaches the reduction region RR, the controller 112 decreases the amount of movement per unit amount of input operation of the cursor CUR. This provides the user U with a feeling of operation that the cursor CUR has difficulty departing from the selected item image GI-1. In this embodiment, when the cursor CUR reaches the outer edge of the item image GI-1 via the reduction region RR, the result of determination by the determiner 113 is affirmative and the controller 112 moves the cursor CUR from the item image GI-1 to the item image GI-2 without dropping in at the region RS.

Figure 8:
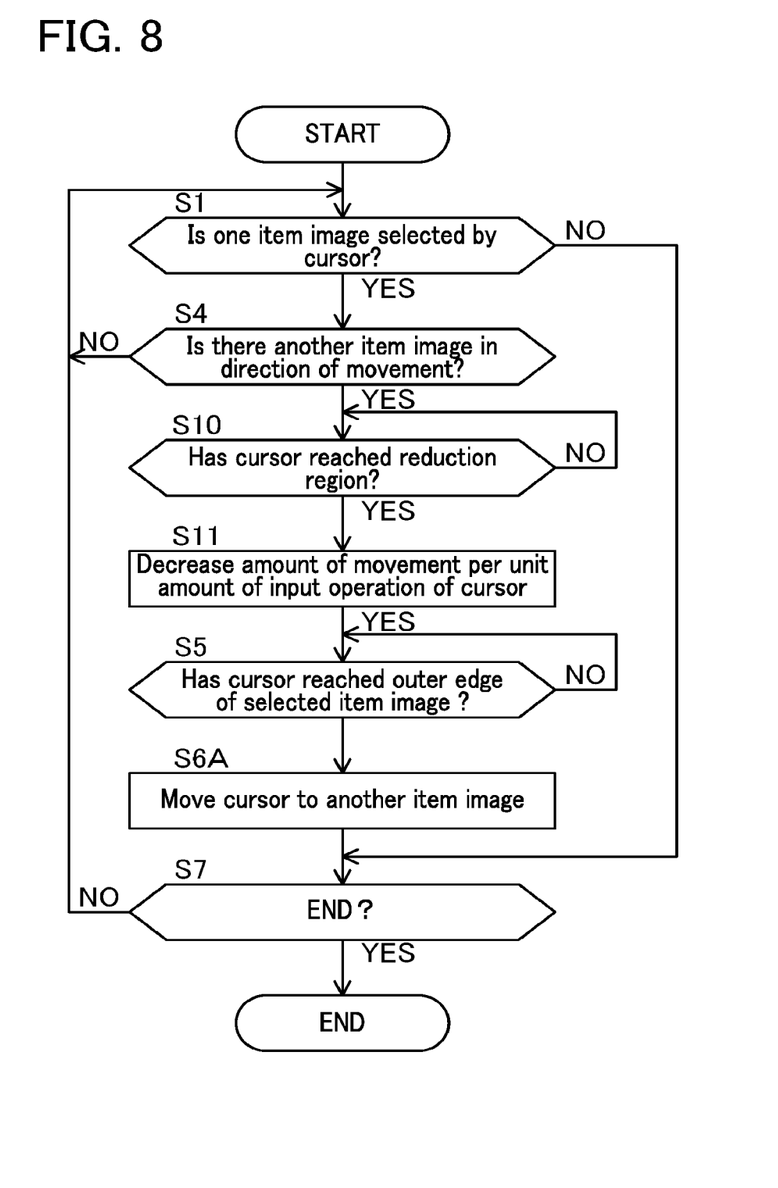
FIG. 8 is a flowchart illustrating an operation of the information processing apparatus according to the second embodiment.

FIG. 8 is a flowchart illustrating an operation of the information processing apparatus according to the second embodiment. A flow of movement control of the cursor CUR in this embodiment will be described below with reference to FIG. 8. As illustrated in FIG. 8, first, the determiner 113 performs the process of Step S1 similarly to in the first embodiment. In this embodiment, when the result of determination at Step S1 is affirmative, the controller 112 performs the process of Step S4. On the other hand, when the result of determination at Step S1 is negative, the controller 112 performs the process of Step S8. When there is another item image GI within the predetermined distance D in Step S4, the controller 112 determines whether the cursor CUR has reached the reduction region RR (S10). Step S10 is repeatedly performed until the cursor CUR reaches the reduction region RR.

When the cursor CUR has reached the outer edge of the selected item image GI, the controller 112 decreases the amount of movement per unit amount of input operation of the cursor CUR (S11). Thereafter, the controller 112 performs the process of Step S5 similarly to in the first embodiment.

When the cursor CUR has reached the outer edge of the selected item image GI, the result of determination made by the determiner 113 is affirmative and the controller 112 moves the cursor CUR to the other item image GI adjacent to the selected item image GI in the moving direction (S7A). At this time, the controller 112 returns to the amount of movement per unit amount of input operation of the cursor CUR to the original value. Thereafter, similarly to in the first embodiment, the controller 112 performs the process of Step S8. In this embodiment, the same advantages as in the first embodiment are achieved.

3. Modifications

The invention is not limited to the embodiments described above. Specific modifications thereof will be described below. Two or more aspects selected from the following modifications may be combined.

(1) In the above embodiments, a configuration in which the display 20 and the imaging device 30 are separated from the information processing apparatus 10 has been described; however, the invention is not limited to this configuration. For example, one or both of the display 20 and the imaging device 30 may be incorporated into the information processing apparatus 10.

Figure 9:
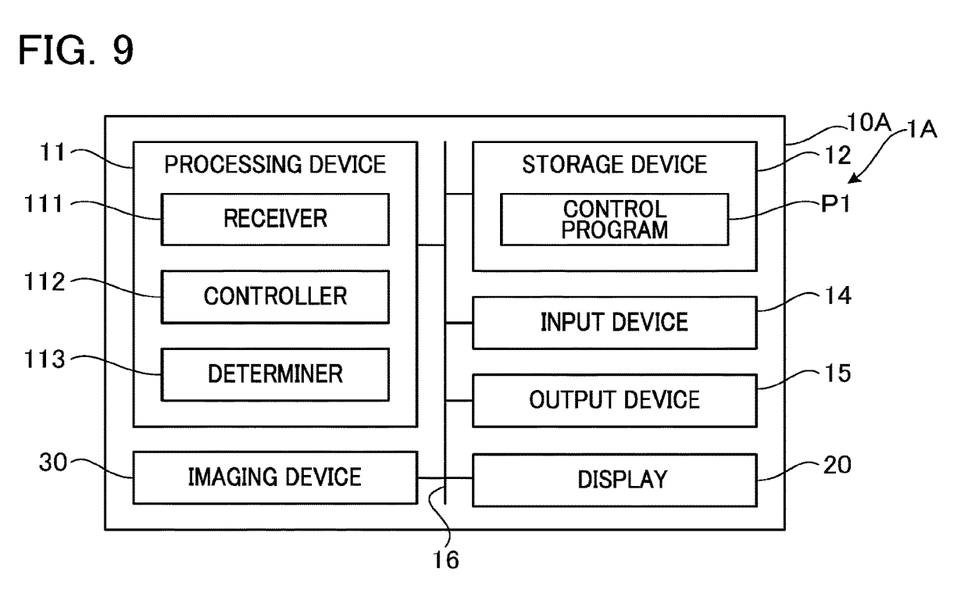
FIG. 9 is a block diagram illustrating a system using an information processing apparatus according to a modification.

FIG. 9 is a block diagram illustrating a system 1A using an information processing apparatus 10A according to a modified example. In the system 1A illustrated in FIG. 9, information processing apparatus 10A, the display 20, and the imaging device 30 are incorporated into one body. Here, the display 20 and the imaging device 30 are communicatively connected to a bus 16 of the information processing apparatus 10A. The communication device 13 in the above embodiments is omitted from the information processing apparatus 10A.

(2) In the above embodiments, the information processing apparatus employs a configuration in which an operation using a gesture of a user U is received by the receiver 111, but it is not limited to this configuration. For example, the receiver 111 may receive an operation from the user U via a pointing device such as a mouse. In general, an operation using a gesture of a user U is less specific than an operation using a pointing device such as a mouse. Accordingly, when an operation using a gesture is received by the receiver 111, advantages which are achieved by applying the invention are particularly remarkable.

(3) The block diagram which is used above for description of the embodiments illustrates blocks of functional units. Such functional blocks (functional units) are realized by a freely chosen combination of hardware and/or software. Means for realizing each functional block is not particularly limited. That is, each functional block may be realized by a single device which is physically and/or logically combined, or may be realized by two or more devices which are physically and/or logically separated and which are directly and/or indirectly linked to each other (for example, in a wired and/or wireless manner). The term "device" above in the embodiments can also be replaced with circuit, device, unit, or the like.

(4) The order of process steps, sequences, flowcharts, and the like of the above embodiments may be changed as long as no technical contradictions arise. For example, in the methods described in this specification, various steps are described as elements of an exemplary sequence, but the methods are not limited to the described sequence.

(5) In the above embodiments, information or the like which is input and output may be stored in a specific place (for example, a memory). The information or the like which is input and output may be overwritten, updated, or added. The information or the like which is output may be deleted. The information or the like which is input may be transmitted to another device.

(6) In the above embodiments, determination may be performed using a value (0 or 1) which is expressed in one bit, may be performed using a Boolean value (true or false), or may be performed by comparison between numerical values (for example, comparison with a predetermined value).

(7) In the above embodiments, the storage device 12 is a recording medium which is readable by the processing device 11, and examples thereof include a ROM and a RANI and further include a flexible disk, a magneto-optical disc (for example, a compact disc, a digital versatile disc, or a Blu-ray (registered trademark) disc), a smart card, a flash memory device (for example, a card, a stick, or a key drive), a compact disc-ROM (CD-ROM), a register, a removable disk, a hard disk, a floppy (registered trademark) disk, a magnetic strip, a database, a server, and other appropriate mediums. A program may be transmitted from a network. A program may be transmitted from a communication network via an electronic telecommunication line.

(8) Information, signals, and the like described in the above embodiments may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, a photo field or photons, or a freely chosen combination thereof.

(9) The functions illustrated in FIG. 2 are realized by a freely chosen combination of hardware and software. The functions may be embodied by a single device or may be embodied by two or more devices that are separate from each other.

(10) Regardless of whether it is called software, firmware, middleware, microcode, hardware description language, or another name, the program described above in the embodiments can be widely construed to refer to commands, a command set, codes, code segments, program codes, a program, a subprogram, a software module, an application, a software application, a software package, a routine, a subroutine, an object, an executable file, an execution thread, a sequence, a function, or the like. Software, commands, and the like may be transmitted and received via a transmission medium. For example, when software is transmitted from a website, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology is included in the definition of the transmission medium.

(11) Information, parameters, and the like which are described in the above embodiments may be expressed in absolute values, may be expressed in values relative to a predetermined value, or may be expressed in other corresponding information. For example, radio resources may be indicated by indices.

(12) In the above embodiments, the information processing apparatus 10 may include a mobile station. A mobile station may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other appropriate terms by those skilled in the art.

(13) In the above embodiments, the term "connected" and all variations thereof refer to all direct or indirect connections or couplings between two or more elements and can include a case in which one or more intermediate elements are present between two elements "connected" to each other. The connection between elements may be physical, or it may be logical, or it may be a combination thereof. In this specification, two elements can be considered to be "connected" to each other using one or more electric wires, cables, and/or printed electric connection or using electromagnetic energy such as electromagnetic energy having wavelengths in the radio frequency range, the microwave range, and the light (both visible light and invisible light) range as non-restrictive and non-comprehensive examples.

(14) The expression "on the basis of" in the above embodiments does not mean "only on the basis of" unless described otherwise. In other words, the expression "on the basis of" means both "only on the basis of" and "at least on the basis of."

(15) Any reference to elements having names such as "first" and "second" which are used in this specification does not generally limit amounts or order of the elements. These names can be conveniently used to distinguish two or more elements in this specification. Accordingly, reference to "first" and "second" elements does not mean that only two elements are employed in this specification or that the first element has to precede the second element in any form.

(16) When the terms, "include" and "including," and modifications thereof are used in this specification or the appended claims, the terms are intended to have a comprehensive meaning similar to the term "comprising." The term "or" which is used in this specification or the claims is not intended to mean an exclusive logical sum.

(17) In the entire disclosure, for example, when an article such as "a", "an", or "the" is added in translation into English, such an article includes a plurality thereof, unless clearly stated otherwise in the context.

(18) It will be apparent to those skilled in the art that the invention is not limited to the embodiments described in this specification. The invention can be corrected and modified in various forms without departing from the gist and scope of the invention defined by the description in the appended claims. Accordingly, the description in this specification is for exemplary explanation and does not have any restrictive meaning for the invention. Two or more aspects selected from aspects described in this specification may be combined.

DESCRIPTION OF REFERENCE SIGNS

1 . . . System
20 . . . Display
111 . . . Receiver
112 . . . Controller
CUR . . . Cursor
G . . . Image
GT, GI-1, GT-2, GI-3, GT-4, GT-5 and GI-6 . . . Item image
L1 and L2 . . . Distance
RR . . . Reduction region
RS, RS1 and RS2 . . . Region
U . . . User

The invention claimed is:

1. An information processing apparatus that displays item images arranged apart from each other and a cursor on a display, the information processing apparatus comprising:
a receiver configured to receive operation information corresponding to details of a cursor operation of allowing a user to move the cursor;
a controller configured to cause the display to display the cursor, based on the operation information; and
a determiner configured to, when the operation information includes an instruction to move the cursor from an inside of one item image from among the item images to an outside of the one item image, determine whether there is another item image within a predetermined distance from the one item image, the another item image being in a direction of movement of the cursor,
wherein the controller is configured to move the cursor to the inside of the another item image by skipping a region between the one item image and the another item image when a result of determination made by the determiner is affirmative.

2. The information processing apparatus according to claim 1, wherein the controller is configured to continuously change a position of the cursor from the inside of the one item image to the outside thereof when the result of determination made by the determiner is negative.

3. The information processing apparatus according to claim 1, wherein the determiner is configured to determine:
whether there is the another item image within the predetermined distance from the one item image, the another item image being in the direction of movement of the cursor, and
whether an amount of input operation indicative of a magnitude of the cursor operation is equal to or greater than a predetermined amount.

4. The information processing apparatus according to claim 3, wherein the controller is configured to set the predetermined amount according to a distance between the one item image and the other item image.

5. The information processing apparatus according to claim 1, wherein the controller is configured to decrease an amount of movement of the cursor per unit amount of the cursor operation in comparison with a case in which the cursor is located in a region other than the item images when the cursor is located in the inside of the one item image.

6. The information processing apparatus according to claim 1, wherein the controller is configured to change an amount of movement of the cursor per unit amount of the cursor operation according to a position between the cursor and an item image from among the item images, the item image being located in the direction of movement of the cursor, when the cursor is located in a region other than the item images.

7. The information processing apparatus according to claim 1, wherein the receiver is configured to receive the operation information based on data from an imaging device that detects a gesture of the user.

8. The information processing apparatus according to claim 2, wherein the determiner is configured to determine:
- whether there is the another item image within the predetermined distance from the one item image, the another item image being in the direction of movement of the cursor, and
- whether an amount of input operation indicative of a magnitude of the cursor operation is equal to or greater than a predetermined amount.

* * * * *